Sept. 4, 1928.
S. GREENHOUSE
FLOAT CONTROLLED VALVE
Filed April 9, 1924
1,683,180
2 Sheets-Sheet 2
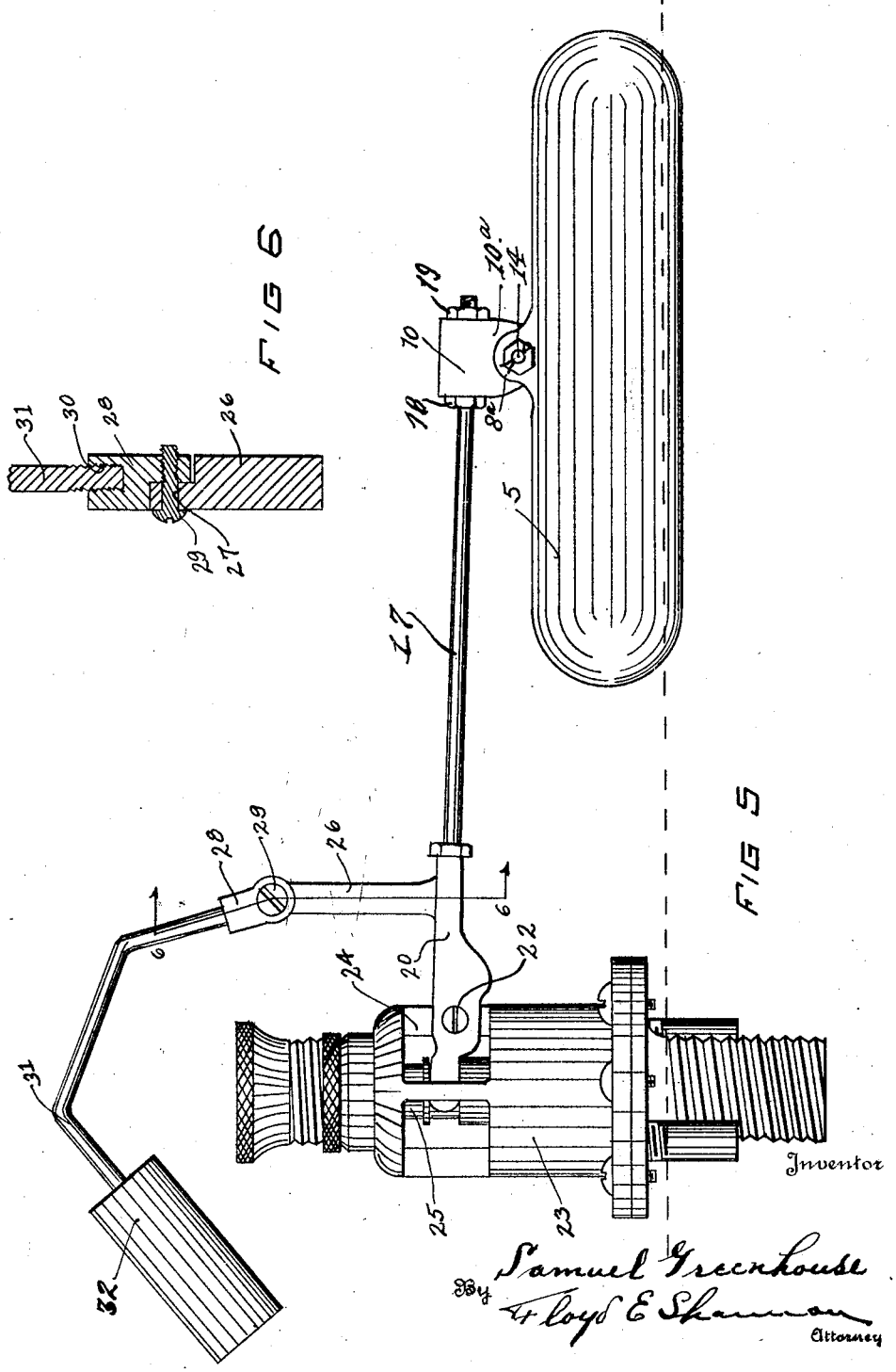

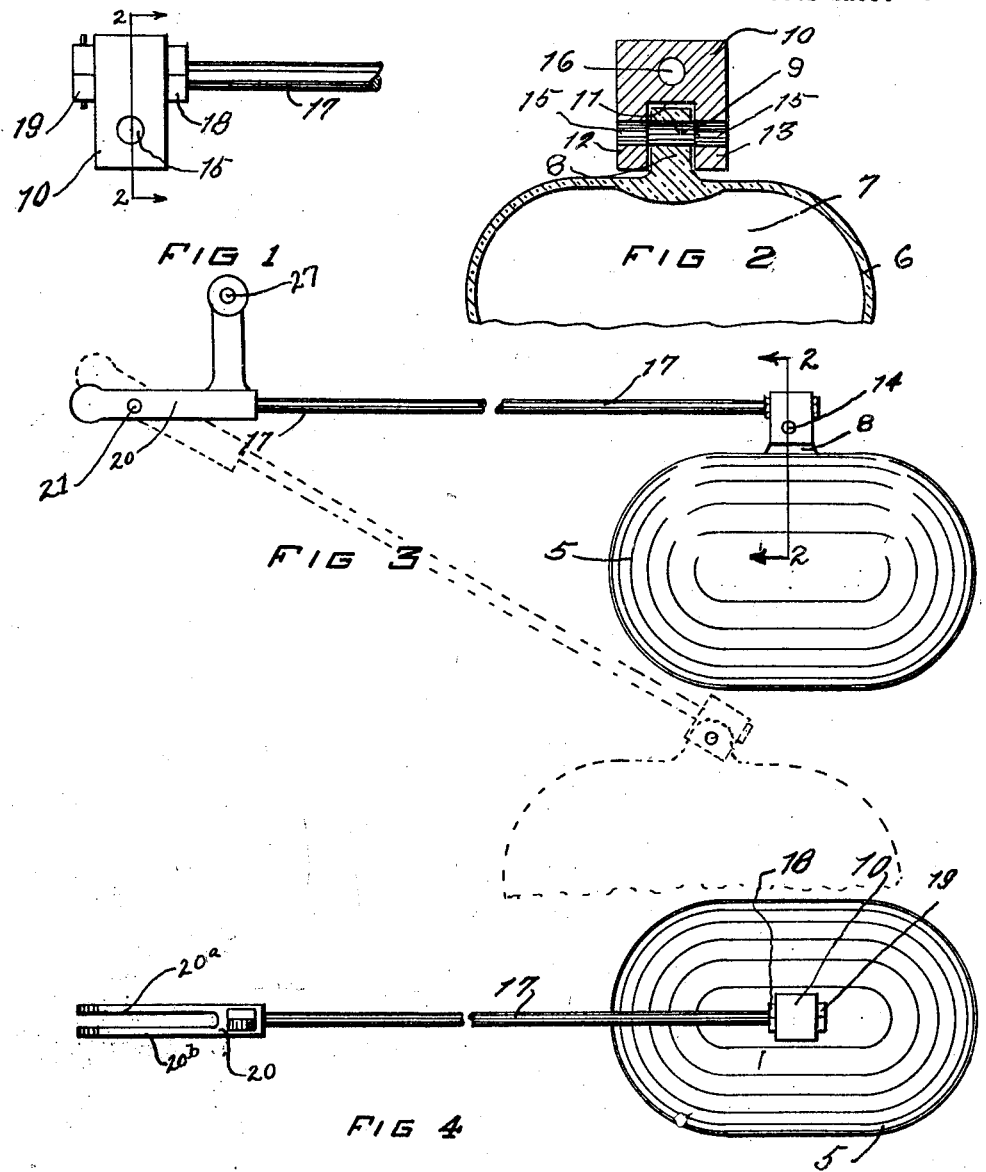

Patented Sept. 4, 1928.

1,683,180

UNITED STATES PATENT OFFICE.

SAMUEL GREENHOUSE, OF AKRON, OHIO.

FLOAT-CONTROLLED VALVE.

Application filed April 9, 1924. Serial No. 705,259.

This invention relates to improvements in floats and has particular relation to a float and float arm adapted for use in operating float controlled valves and other float controlled devices.

While the invention is capable of general application it is particularly designed for use in connection with bottling machines, to operate the valves controlling the inlet tubes such as is shown and described in my pending application, Serial Number 680,624.

Objects of the invention are to provide a strong, durable float of simple construction which may be manufactured at a low cost and which may be used in a limited space and will provide a maximum of buoyancy without materially reducing the swinging arc of the arm.

A particular object is to provide a float and arm and to provide means whereby the arm may be pivotally secured to the float for movement on an axis parallel to the axis on which the arm is fulcrumed.

A further object which may be considered in connection with the above objects is to provide an elongated hollow float having its greatest diameter disposed longitudinally of the float arm and provided on the upper side thereof with an upstanding lug which is pivotally secured to the float arm whereby the float while in operation may be maintained in a horizontal position.

An additional object is to provide a float of new and improved construction having an arm pivotally secured to the upper side thereof whereby the pivotal connection will at all times be above the water and will therefore be more efficient and durable than floats of the ordinary type.

Another object is to provide a new and improved float arm in which means is provided for counter-balancing the float and to thereby provide an easily operable arm which will respond instantly to the action of the float.

The above objects are accomplished and additional ends are attained by the novel construction, combination and arrangement of parts hereinafter described with reference to the accompanying drawing in which I have shown a preferred embodiment of the invention, it being understood that the invention is capable of various adaptations and that changes and modifications may be made or substitutions resorted to which come within the spirit of the invention as set forth in the appended claims.

In the drawings which form a part hereof similar characters of reference are employed to designate like parts as the same may appear in any of the several views and in which:—

Figure 1 is a fragmentary view showing in side elevation the end portion of the arm employed in carrying out this invention and particularly illustrating the improved fork used in connecting the arm to the float.

Figure 2 is a cross-sectional view taken as indicated by the lines 2—2 of Fgure 3.

Figure 3 is a side elevational view of a float and float arm constructed in accordance with this invention.

Figure 4 is a top plan view of same with parts of the float rod broken away to conserve space.

Figure 5 is a side elevational view showing a modified form of the float and float arm operatively connected to the inlet valve of a bottling machine, such as is shown and described in my co-pending application, Serial Number 680,624.

Figure 6 is a cross sectional view taken as indicated by lines 6—6 of Figure 5.

Proceeding now to a detailed description of the invention with reference to the particular adaptation thereof illustrated in the accompanying drawing, the numeral 5 is used, generally, to denote a float which is preferably formed of hard rubber, but which may be formed of any suitable material.

The float disclosed in the drawings, is hollow having a relatively thin wall 6 and being provided with a cavity 7. The float 5 is elongated having a cylindrical, central portion which terminates at each end in a semi-spherical portion. The float 5 is provided on the upper side thereof with a centrally positioned upstanding lug 8. The lug is positioned with its greater width disposed longitudinally of the float. The lug 8 is provided with a bore 9 which projects transversely therethrough at a right angle to the float arm.

The numeral 10 denotes a fork which is in the form of a rectangular block provided on the lower face thereof with a channel 11 which extends longitudinally thereof, thus forming the relatively flat parallel fork members 12 and 13. The channel 11 is designed to receive the lug 8 which is positioned therein and is secured thereto by means of a pin 14 which is positioned through the bore 15 in the fork members 12 and 13 and through the bore 9 in the lug 8. The pin 14 may be detachably secured in position by means of cotter pins or other suitable fastening means (not shown in these figures). The block 10 is further provided with a bore 16 which extends therethrough at a right angle to the bore 15. The end of the rod 17 is provided with the screw threads and is positioned in the bore 16 and the nuts 18 and 19 are threaded on the end of the said rod with the block 10 positioned therebetween. The bore 16 may be threaded to receive the end of the rod and the nuts 18 and 19 may be operated to securely hold the block 10 in place. The rod 17 may be operatively connected in any suitable manner to a valve or other float operated device.

The numeral 20 denotes a lever which is provided in one end thereof with a threaded bore into which the rod 17 is threaded. The lever 20 is provided with two forks 20ª and 20ᵇ. A bore 21 extends through said forks. The numeral 22 denotes a screw, pin or other like means which is fitted in the bore 21 to fulcrum the lever 20 to any suitable support.

I have shown an inlet controlling valve 23 which is provided with a bar 24. The bar 24 is embraced by the forks 20ª and 20ᵇ and is provided with a suitable bore for the reception of the bolt 22. The inwardly projecting ends of the forks 20ª and 20ᵇ engage the valve rod 25 whereby an upward and downward movement of the float 5 will operate the valve 25. The lever 20 is provided adjacent the outer end thereof with a vertical extension 26. The extension 26 is provided at the upper end thereof with an eye 27. The numeral 28 denotes a member which is provided with a like eye and is arranged against the upper end of the extension with said eye in axial alinement. The numeral 29 denotes a screw bolt which is positioned through the eye 27 and is threaded on the member 28 whereby the member 28 may be selectively positioned on the member 26 by operating the screw 29. The other end of the member 28 is provided with the threaded bore 30 in which is threaded a rod 31. The rod 31 is bent or curved so as to project rearwardly past the fulcrum 22. The rearwardly projecting end of the rod 31 is threaded and a weight 32 which is provided with a threaded bore adapted to receive the end of said rod is operatively secured thereon. The float 32 is of sufficient weight to almost balance the float 5 so that the float may respond to a slight raise in the liquid in which it is mounted.

In Figure 5 there is shown a modified form of connection between the block 10 and the float 5. In this modified form, the float is provided with two upstanding, spaced, parallel ears 8ª and the block 10 is provided with a depending ear 10ª which is received between the ears 8ª. The ears 10ª and the ears 8ª are provided with suitable coinciding bores in which is operatively positioned the pin 14 thereby pivotally securing the float to the arm.

An additional advantage of the counter balanced float herein described lies in the fact that the weight 32 will assist in moving the valve stem 25 should the same become stuck.

The float 5 being elongated and being pivotally secured to the fork members 12 and 14 will in use remain in a horizontal position, thus providing for a movement through a greater arc in a limited space than could be attained by an ordinary float of equal buoyancy.

Having thus illustrated my invention and described the same in detail, what I claim as new and desire to secure by Letters Patent is:—

1. In combination, an elongated float having an upstanding lug on the upper side thereof, said lug disposed longitudinally of the float and having a bore extending therethrough at a right angle to the greatest diameter of the float, a float arm having a horizontal bore adjacent one end thereof whereby the same may be fulcrumed for movement in a vertical plane, a fork secured to the free end of said arm, said fork embracing said lug and a pin extending through alined bores in the members of said fork and in said lug to pivotally secure said float to said arm.

2. In combination, a horizontally disposed elongated float, a centrally positioned upstanding lug on the top of said float, said lug having a horizontal bore extending therethrough transversely of said float; and a float arm comprising a rod, a block secured to the free end of said rod said block provided with depending fork members, said members being spaced apart to receive said lug, said fork members having bores alined with the bore in said lug and a pin positioned in said bores to pivotally secure the float to the arm.

3. In a device of the class described, a lever, a float on the outer end thereof, means to fulcrum said lever for movement on a horizontal axis, a support projecting upwardly from said lever, said support extending to a point on the side of said fulcrum opposite the side on which the float is positioned and a weight on the end of said support.

4. In a device of the class described, a lever, a float mounted on the outer end thereof, means to fulcrum said lever for movement on a horizontal axis, a vertical extension projecting upwardly from said lever at a point between the fulcrum and the float; an arm adjustably secured to the upper end of said extension, said arm projecting to a point on the other side of said fulcrum than the side on which the float is positioned and a weight secured to the free end of said arm.

5. In a device of the class described, a lever, means to fulcrum said lever for movement on a horizontal axis, a float on the outer end of said lever, an arm projecting from said lever to a point between the fulcrum and said float, said arm extending to a point on the opposite side of said fulcrum to that on which the float is positioned and a weight on the end of said arm.

6. In a float operated valve, in combination, a casing, a valve stem mounted for vertical movement therein, a lever fulcrumed on said casing for movement on a horizontal axis, one end of said lever engaging said stem, a float on the other end of said lever, an arm secured to said lever at a point between said fulcrum and said float, said arm projecting to a point on the opposite side of said fulcrum to that on which the float is positioned and a weight on the end of said arm.

7. In a float operated valve, in combination, a valve casing, a valve stem mounted for vertical movement; a lever fulcrumed on said casing, for movement on a horizontal axis, one end of said lever engaging said stem, an elongated float on the other end of said lever, said float arranged longitudinally of said lever, a centrally positioned lug on the upper side of said float, means to pivotally secure said lever to said lug for movement on an axis parallel to the fulcrum, an arm secured to said lever at a point between said lever and said float, said arm projecting to a point on the other side of said fulcrum than that on which the float is positioned and a weight on the end of said arm.

In testimony whereof I have hereunto set my hand.

SAMUEL GREENHOUSE.